(12) United States Patent
Lu

(10) Patent No.: US 8,506,200 B2
(45) Date of Patent: Aug. 13, 2013

(54) RAPID LOCKING HAND KNOB CONSTRUCT

(76) Inventor: Qi Lu, Ningbo (CN)

( * ) Notice: Subject to any disclaimer, the term of this patent is extended or adjusted under 35 U.S.C. 154(b) by 0 days.

(21) Appl. No.: 13/276,571

(22) Filed: Oct. 19, 2011

(65) Prior Publication Data

US 2013/0028656 A1 Jan. 31, 2013

(30) Foreign Application Priority Data

Jul. 26, 2011 (CN) ........................ 2011 2 0265682 U

(51) Int. Cl.
*F16B 7/10* (2006.01)

(52) U.S. Cl.
USPC .................. 403/109.2; 403/109.5; 403/109.4; 403/374.4

(58) Field of Classification Search
USPC ................ 403/109.1, 109.4, 109.5, 334, 350, 403/351, 374.3, 374.4; 248/411, 412
See application file for complete search history.

(56) References Cited

U.S. PATENT DOCUMENTS

| | | | | |
|---|---|---|---|---|
| 2,213,400 A * | 9/1940 | Laughridge | .................... | 403/370 |
| 3,083,041 A * | 3/1963 | Owenmark | ........................ | 285/7 |
| 4,277,197 A * | 7/1981 | Bingham | ....................... | 403/104 |
| 5,011,104 A * | 4/1991 | Fang | ........................... | 248/125.8 |
| 5,823,578 A * | 10/1998 | Chiou | .............................. | 285/38 |
| 5,983,455 A * | 11/1999 | Polzin et al. | .................... | 16/429 |
| 6,761,274 B1 * | 7/2004 | Chen | .............................. | 211/207 |
| 8,043,020 B2 * | 10/2011 | Peng | ........................... | 403/109.5 |
| 8,117,787 B2 * | 2/2012 | Lee | ............................... | 52/127.2 |
| 2005/0220534 A1 * | 10/2005 | Ober | ............................ | 403/370 |

FOREIGN PATENT DOCUMENTS

CN 201589047 9/2010

OTHER PUBLICATIONS

English Abstract of CN201589047.

* cited by examiner

*Primary Examiner* — Joshua Kennedy
(74) *Attorney, Agent, or Firm* — Preston Smirman; Smirman IP Law, PLLC

(57) ABSTRACT

A rapid locking hand knob construct includes a fixed threaded sleeve having an inner groove around its outer diameter that is mated to a rubber sleeve. One end of a first tube is connected to an inside diameter of one end of a fixed ring. The fixed ring has a groove provided around an outside diameter at an end thereof and an inner conical surface provided around an inside diameter at another end thereof. The tube hole at the end of a second tube is mated to a locking lining, wherein one end thereof includes an outer tapered surface that is inserted into an inner tapered surface of the fixed ring. A hole on the fixed threaded sleeve is secured into the groove of the fixed ring by a screw. A rotary rubber sleeve drives the movable thread sleeve up and down horizontally in the direction of the tube fitting.

5 Claims, 8 Drawing Sheets

RAPID LOCKING HAND KNOB CONSTRUCT

CROSS-REFERENCE TO RELATED APPLICATION

The instant application claims priority to Chinese Patent Application Serial Number CN 201120265682.0, filed Jul. 26, 2011, the entire specification of which is expressly incorporated herein by reference.

FIELD OF THE INVENTION

The present invention relates to a hand knob construct of a tripod, which is a rapid locking hand knob construct.

BACKGROUND OF THE INVENTION

The tripod is a device used for stabilizing the equipment such as cameras and video cameras to achieve a given photography and shooting result, which generally consists of a pan/tilt and a frame body, wherein the frame body consists of three support frames and one main frame. To facilitate the height adjustment of the pan/tilt, each support leg consists of a group of leg tubes adjusted and fixed by a hand button mechanism. As disclosed in China Patent Literature, this new invention is titled "A locking device for tripod leg tubes", with an authorized notification No. of CN 201589047U and the authorized notification date of Sep. 22, 2011, such a tripod leg tube locking device consists of a threaded sleeve with one end connected to an upper tube, an inner wall on the other end and a lower tube forming a chamber with an open lower end. Such chamber is at least provided with a locking ring fitted on the lower tube. The aforesaid locking ring is provided with an opening and the aforesaid threaded sleeve is connected with the outside of the locking knob. Such a locking knob is provided with a shrink hole on its lower end to prevent the aforesaid locking ring from sliding away from the chamber. In the above-mentioned structure, the threaded sleeve has a poor locking force and poor structure stability. Besides, in existing similar products, the internal locking lining can easily come away and be displaced when the movable threaded sleeve and the fixed sleeve are completely disconnected, as a result of which, the locking lining is not located at its correct position when re-locking, thus resulting in the failure of the locking function.

Accordingly, there exists a need for a new and improved locking system for a tripod that overcomes at least one of the aforementioned disadvantages.

SUMMARY OF THE INVENTION

To eliminate the aforesaid deficiency, the present invention aims to provide a rapid locking hand knob construct capable of locking and releasing the leg tubes by way of up-and-down rotation and movement, so as to solve the technical problems such as lack of locking force of existing similar products in the tripod application and the easy function failure at the time of relocking in the released condition. Such a purpose is realized by way of the technical scheme as follows:

A rapid locking hand knob construct disposed between a first tube and a second tube, and the rapid locking hand knob construct is secured at the end of the first tube by fitting a tube hole fabricated on the second tube into the first tube through a convex rib of a stop block with a symmetrical outer diameter; the second tube is adjusted and fixed at a position inside the first tube through the hand knob construct. Such a hand knob construct comprises a fixed ring, a rubber sleeve, a seal ring, a fixed threaded sleeve, a plastic ring, a locking lining, a movable thread sleeve and a screw; wherein the fixed threaded sleeve has an inner groove around its outside diameter mated to the rubber sleeve; the main design feature of the construct is that that one end of the fixed threaded sleeve is mated to one end of the seal ring, forming a hollow body with an inner part having the fixed threaded sleeve, rubber ring, locking lining and movable thread sleeve; the fixed thread sleeve, stop block, plastic ring, locking lining and movable threaded sleeve of the hand knob construct are fixed in the fixed threaded sleeve via the seal ring. One end of the first tube is connected to the inside diameter of one end of the fixed ring and the fixed ring has a fixed ring groove provided around an outside diameter at the end of the fixed ring and an inner tapered surface provided around an inside diameter at another end of the fixed ring; wherein the tube hole at the end of the second tube is mated to the locking lining and that one end of the locking lining is fabricated with an outer tapered surface that is inserted into the inner conical surface of the fixed ring; the threaded sleeve hole of the fixed threaded sleeve is secured into the fixed ring groove of the fixed ring by the screw. The hand knob construct between the first tube and second tube is secured in position by locking the outer tapered surface of the locking lining with the inner tapered surface of the fixed ring, and is released by unlocking the outer tapered surface of the locking lining with the inner tapered surface of the fixed ring. The rotation of the rubber sleeve drives the movable threaded sleeve to move up and down horizontally relative to the elements of the tubes to achieve the locking and releasing of the hand knob construct.

The inner tapered surface of the fixed ring is provided with a fixed groove and the outer conical surface of the locking lining is provided with a fixed rib, with the fixed groove on the inner conical surface buckled with the fixed rib on the outer tapered surface. The above-mentioned structure further stabilizes the position of the locking and releasing between the outer tapered surface of the locking lining and the inner tapered surface of the fixed ring, thus improving the locking force and anti-failure function.

The other end of the locking lining is connected with the movable thread sleeve. The movable threaded sleeve guarantees the relative rotation between the fixed threaded sleeve and the locking lining, so that the rotation of the fixed threaded sleeve will not affect the locking and release condition of the locking lining.

The locking lining is provided with a lining ring groove on the outside diameter of such end and the lining ring groove is provided with an outer convex rib in it. An inner ring rib is provided in the movable threaded sleeve whereas the inner ring rib is provided with a threaded sleeve groove. The lining ring groove of the locking lining is buckled with the movable threaded sleeve whereas the outer convex rib of the lining ring groove is buckled with the threaded sleeve groove of the inner ring rib. The above-mentioned structure makes the locking lining and the movable threaded sleeve interconnected, with the mutual displacement unlikely to occur, thus improving the locking force and anti-failure function.

A plastic ring is provided in the fixed ring groove on the outside diameter of the fixed ring and the screw is connected to a plastic ring hole via the threaded sleeve hole of the fixed threaded sleeve. The rubber ring is provided with an opening. The rubber ring further stabilizes the rotation between the fixed ring and the fixed threaded.

The locking lining is provided with long slots on its both ends respectively. The long slot hole makes the locking lining flexible, thus making it is easier for one end of the locking lining to buckle with the movable threaded sleeve and the other end to fit with the inner tapered surface of the fixed ring, which can increase the contact area with the second tube at the time of locking.

The first tube and second tube are provided with inner convex ribs respectively, which further stabilize the relative displacement between the first tube and second tube.

The present invention achieves the locking and releasing of the hand knob construct elements between the leg tubes through the upwards and downwards rotation movement. Due to its reasonable design, easy operation, stable structure, huge locking force, unlikeliness of failure and tight locking, it is suitable for the adjustment and locking of tripod leg tubes as well as tube elements of other similar products and their structure improvement.

Further areas of applicability of the present invention will become apparent from the detailed description provided hereinafter. It should be understood that the detailed description and specific examples, while indicating the preferred embodiment of the invention, are intended for purposed of illustration only and are not intended to limit the scope of the invention.

BRIEF DESCRIPTION OF THE DRAWINGS

Other advantages of the present invention will be readily appreciated, as the same becomes better understood by reference to the following detailed description when considered in connection with the accompanying drawings wherein.

REFERENCE NUMBERS AND NAMES IN THE DRAWINGS

Figure 1:
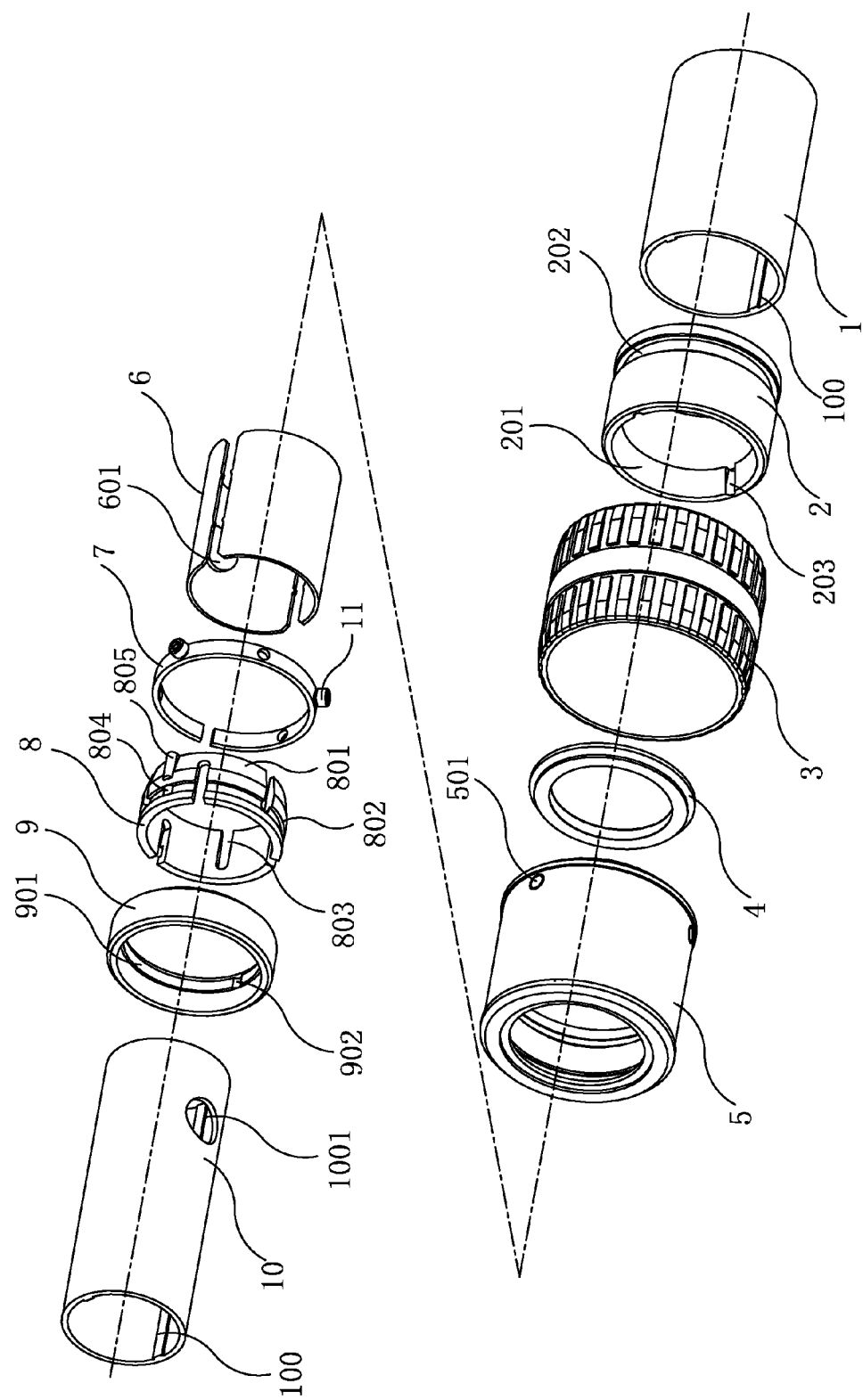
FIG. 1 is an exploded schematic diagram of the present invention.

1—first tube;
2—fixed ring;
201—inner tapered ring;
202—fixed ring groove;
203—fixed groove;
3—rubber sleeve;
4—seal ring;
5—fixed threaded sleeve;
501—threaded sleeve hole;
6—stop block;
601—convex rib in the block;
7—plastic ring;
701—rubber ring hole;
8—locking lining;
801—outer tapered surface;
802—sleeve ring groove;
803—long slot hole;
804—outer convex rib;
805—fixed rib;
9—movable threaded sleeve;
901—inner ring rib;
902—threaded sleeve groove;
10—second tube;
1001—tube hole;
11—set screw; and
100—convex rib in the pipe.

The same reference numerals refer to the same parts throughout the various Figures.

DETAILED DESCRIPTION OF THE INVENTION

Referring generally to the drawings, further description is given as follows with regard to the present invention and its operation.

As shown in FIG. 1, the hand knob construct comprises a fixed ring (2), a rubber sleeve (3), a seal ring (4), a fixed threaded sleeve (5), a plastic ring (7), a locking lining (8), a movable threaded sleeve (9) and a screw (11). As shown in FIGS. 5-8, the tube hole (1001) fabricated on the second tube (10) is fitted into the first tube (1) through a convex rib (601) of a stop block (6) with a symmetrical outer diameter. The first tube and second tube are provided with convex rib (100) in their inside diameters respectively. The hand knob construct is attached on one end of the first tube, and the rubber sleeve is provided in the groove on the outside diameter of the fixed threaded sleeve, with the fixed threaded sleeve, plastic ring, locking lining, movable threaded sleeve fixed in the hollow body formed by fixed threaded sleeve and seal ring. The fixed ring is provided with the inner tapered surface (201) on the inside diameter of one end, and the inner tapered surface is provided with a fixed groove (203), with the fixed ring groove (202) provided on the outside diameter on the other end. The fixed ring of the fixed threaded sleeve is provided with a threaded sleeve hole (501). The plastic ring is provided with an opening on its side and the plastic ring is provided with the rubber ring hole (701). The outside diameter on one end of the locking line is provided with the outer tapered surface (801), the outer tapered surface is provided with a fixed rib (805), the outside diameter on the other end of the locking lining is provided with a sleeve ring groove (802), the sleeve ring groove is internally provided with outer convex rib (804) and the locking lining is respectively provided with long slot holes (803). The movable threaded sleeve is provided with inner ring rib (901) on its inside diameter on its locking lining end, with its inner ring rib provided with a threaded sleeve groove (902).

As shown in FIG. 1 and FIGS. 3-8, and by way of a non-limiting example, when assembling the hand knob construct, first connect the fixed ring to the first tube, with the rubber ring provided in the fixed ring groove of the fixed ring. By buckling with the sleeve ring groove of the movable threaded sleeve and the outer convex rib via the inner ring rib and threaded sleeve groove, the locking lining is fixed in the movable threaded sleeve. Attach the seal ring on the fixed threaded sleeve, and then screw the movable threaded sleeve onto the end of the fixed threaded sleeve via the threads. Pass the second tube through the fixed threaded sleeve assembly, fit the stop block on the side and then install it into the first tube so that the inner tapered surface of the fixed ring is engaged with the outer tapered surface on the locking lining. The fixed groove on the inner tapered surface engages with the convex rib on the outer tapered surface. The threaded sleeve hole of the fixed threaded sleeve is aligned with plastic ring hole of the plastic ring. The screw is screwed into the threaded sleeve hole of the fixed threaded sleeve and the screw is inserted into the plastic ring hole of the plastic ring. Fit the groove on the outside diameter of the fixed threaded sleeve. This is the end of the assembly of the hand knob construct.

Figure 2:
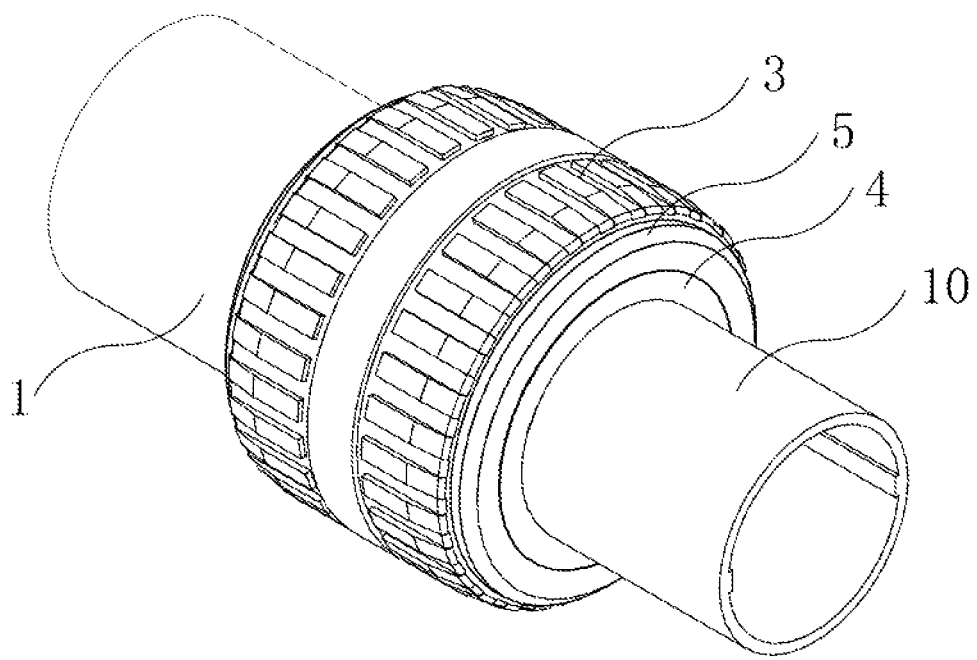
FIG. 2 is a schematic diagram of the present invention.
Figure 3:
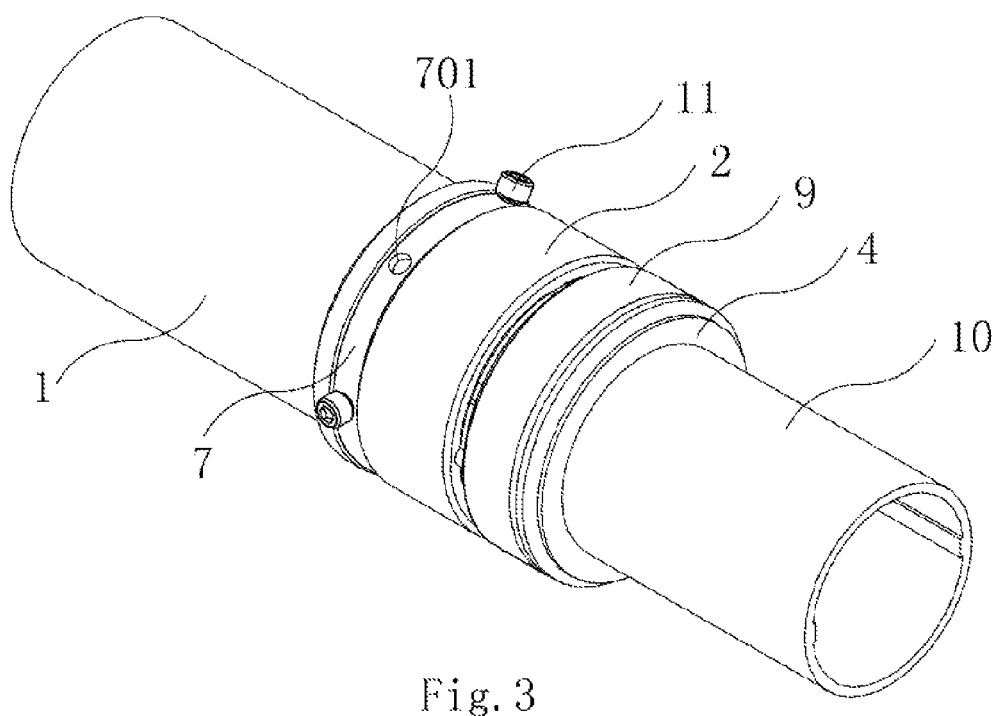
FIG. 3 is a schematic diagram of the present invention, wherein the rubber sleeve and fixed threaded sleeve have been omitted for purposes of illustration.
Figure 4:
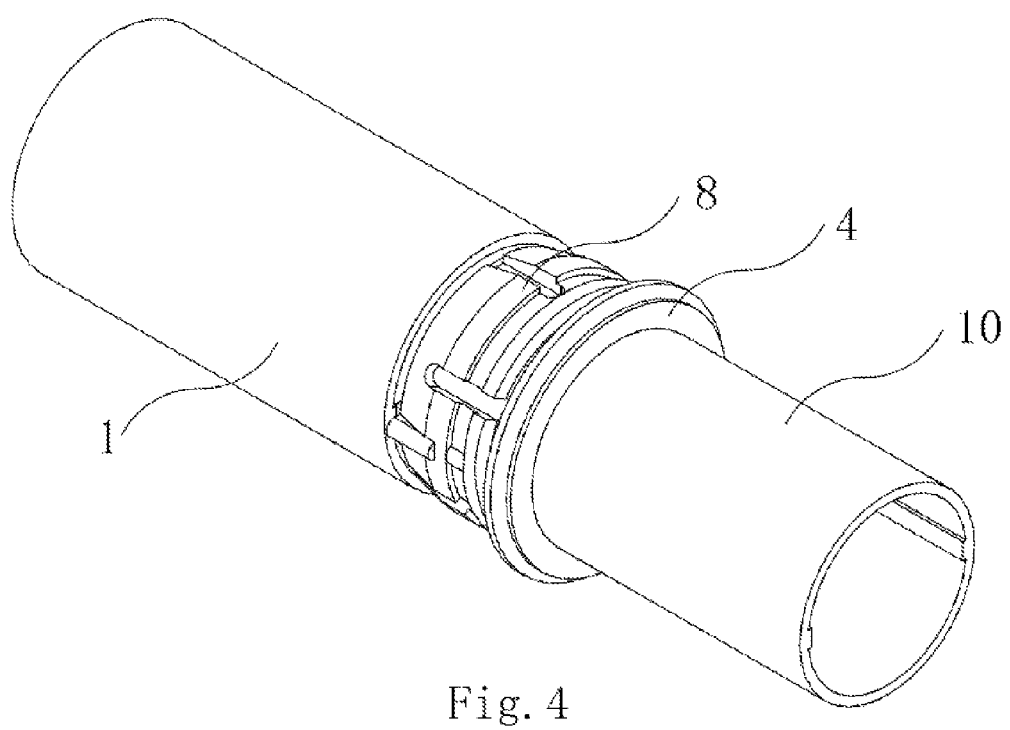
FIG. 4 is a schematic diagram of the present invention, wherein the fixed ring, plastic ring and movable threaded sleeve have been omitted for purposes of illustration.
Figure 5:
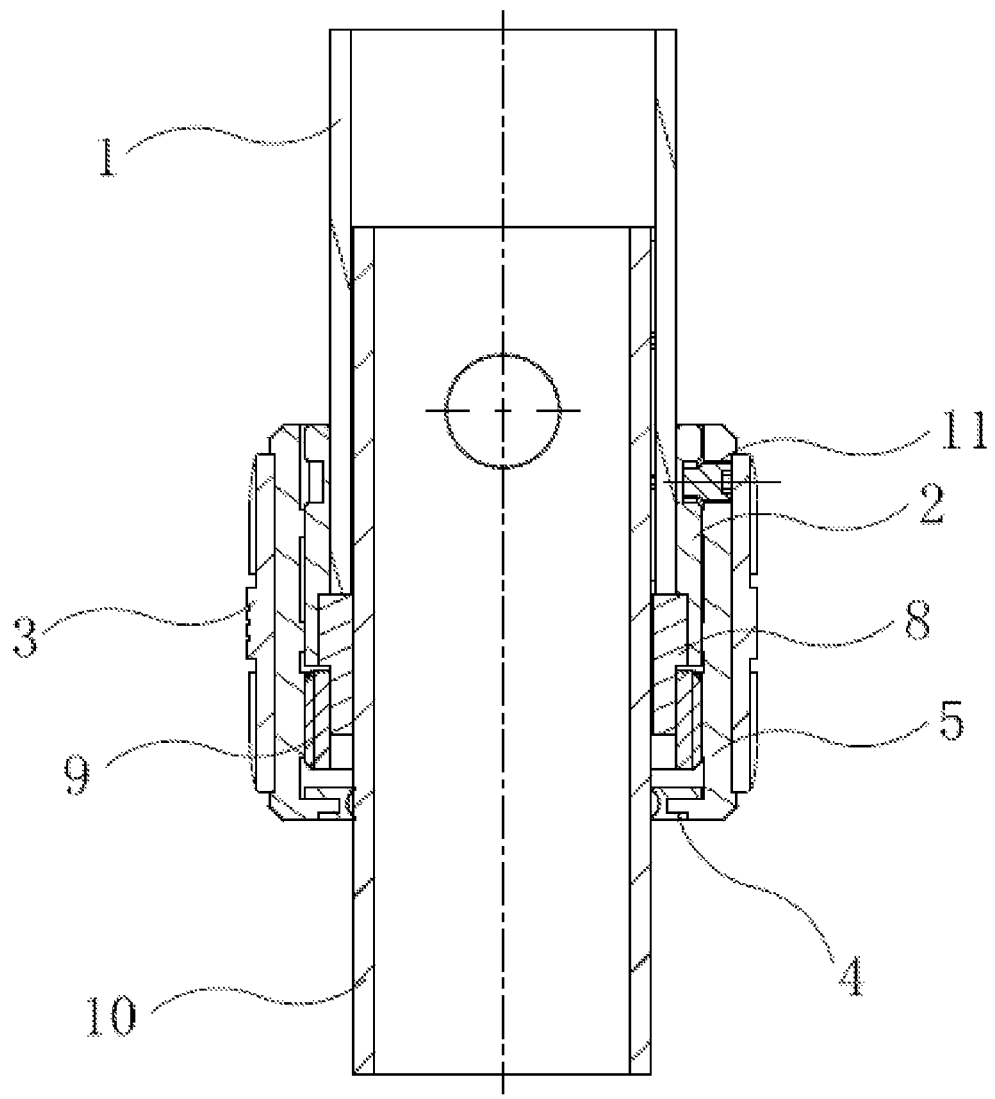
FIG. 5 is a schematic diagram of the present invention in a locking condition.
Figure 6:
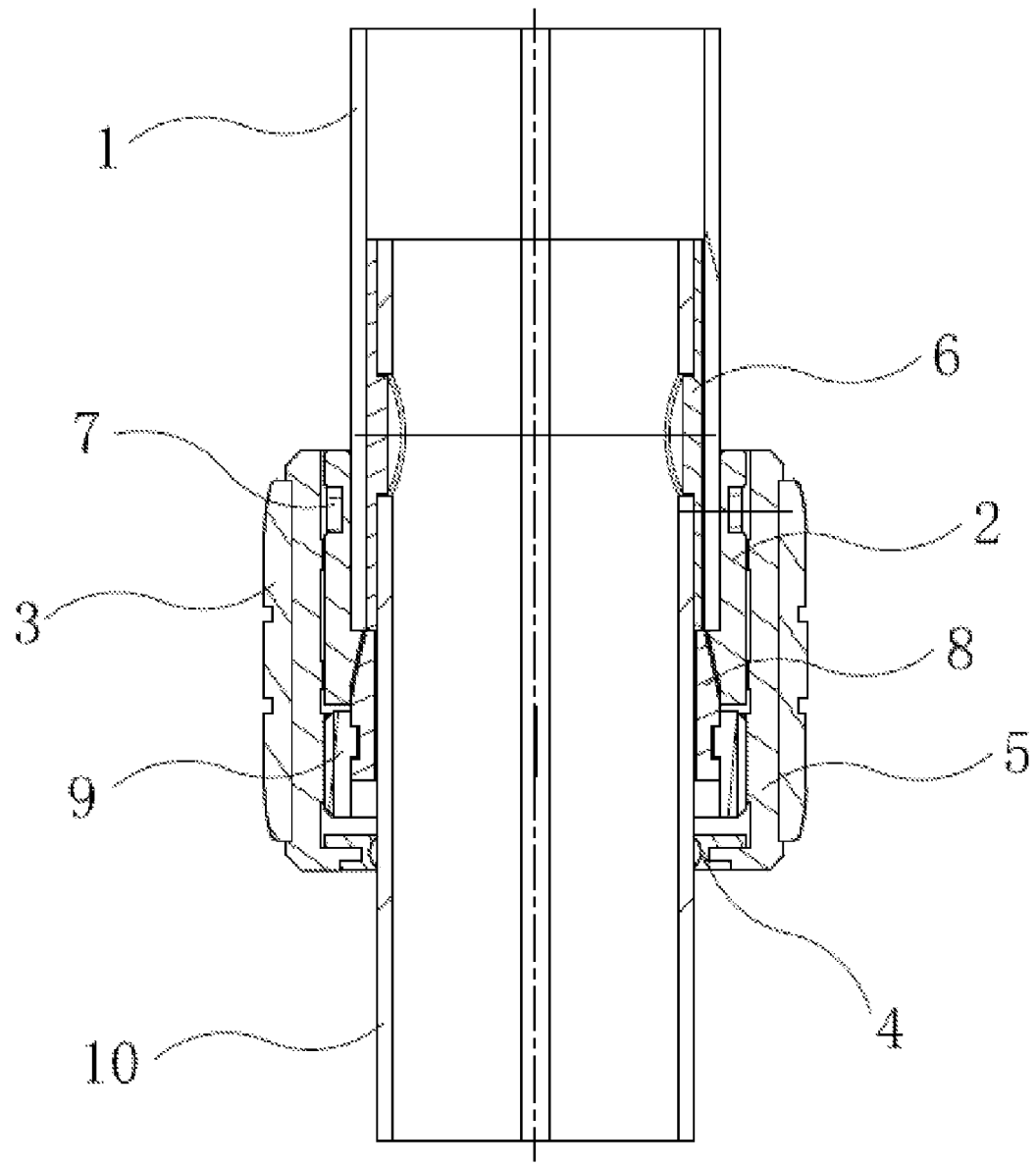
FIG. 6 is another schematic diagram of the present invention in a locking condition.
Figure 7:
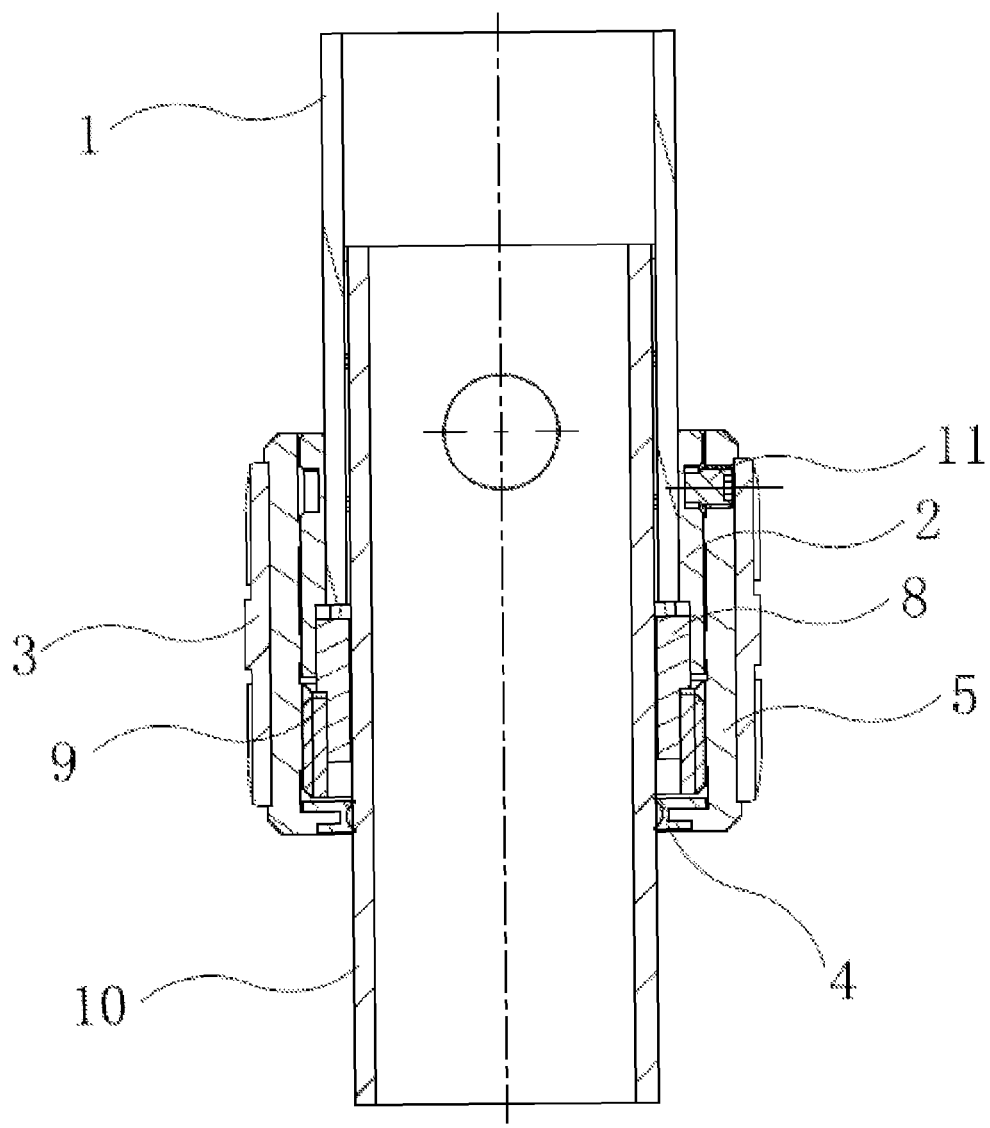
FIG. 7 is a schematic diagram of the present invention in a release condition.
Figure 8:
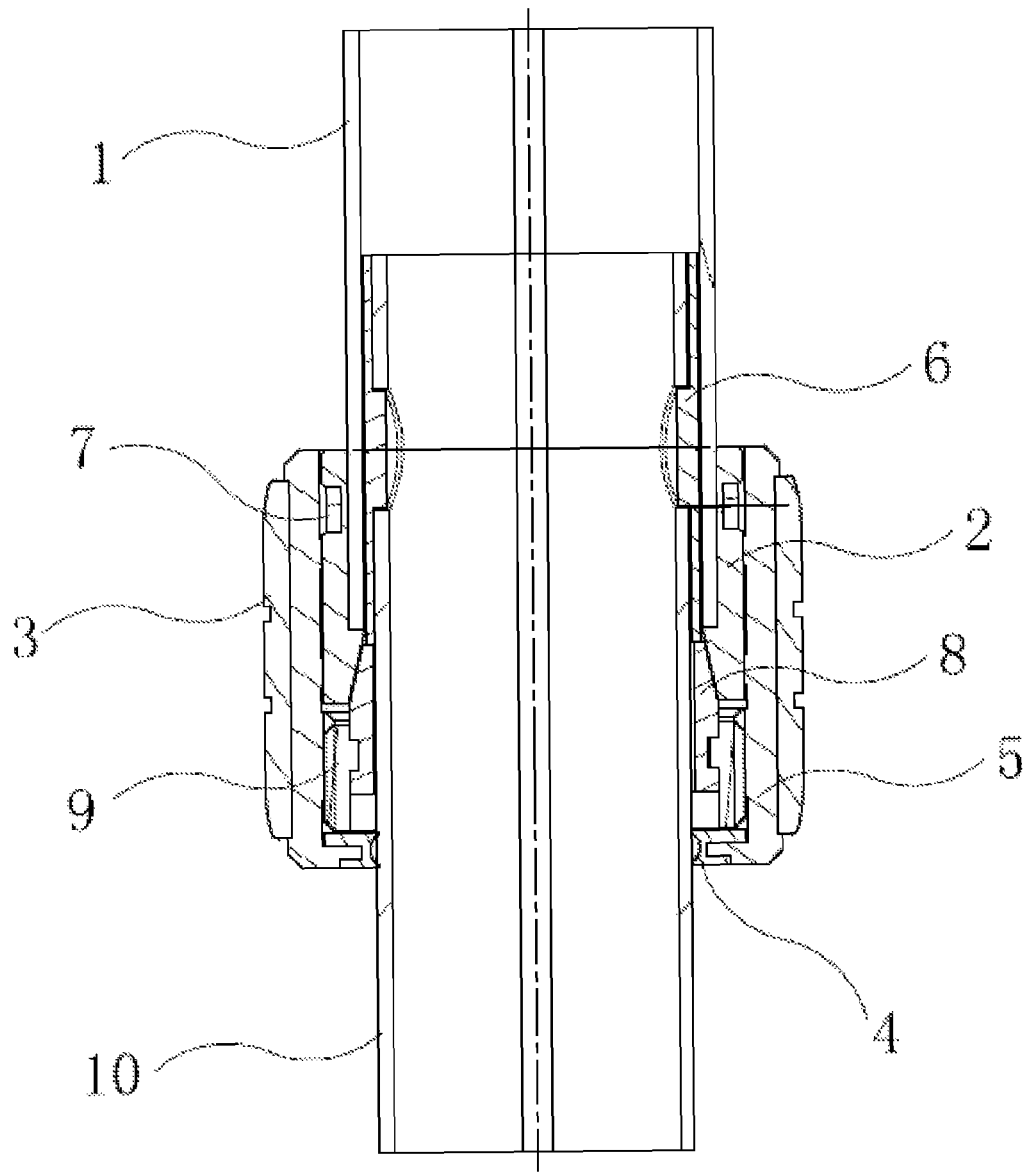
FIG. 8 is another schematic diagram of the present invention in a release condition.

When using it, by way of a non-limiting example, as shown in FIG. 2, rotate clockwise to fix the threaded sleeve and drive the movable threaded sleeve to move upwards, as shown in FIGS. 5-6, thus locking the second tube. Turn the fixed threaded sleeve counterclockwise to fix the threaded sleeve and drive the movable sleeve to move downwards, as shown in FIGS. 7-8, thus releasing the second tube (10).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A rapid locking hand knob construct disposed between a first tube member and a second tube member slidably received within the first tube member, wherein the rapid locking hand knob construct is secured at an end portion of the first tube member by selectively engaging an area defining an aperture formed on the second tube member with a rib member formed on an interior surface of a stop block member, wherein the stop block member is selectively operable to be slidably received within the first tube member, wherein the stop block member is selectively operable to limit displacement of the second tube member relative to the first tube member, comprising:

a first ring member, wherein the first tube member is selectively operable to be received in the first ring member;

a first sleeve member, wherein the first ring member is selectively operable to be received within the first sleeve member;

a seal ring member;

a second sleeve member, wherein the seal ring member is selectively operable to engage a surface of the second sleeve member, wherein the first sleeve member is selectively operable to engage an area defining a groove formed on an exterior surface of the second sleeve member, wherein the first ring member is selectively operable to be received within the second sleeve member;

a second ring member, wherein the second ring member is selectively operable to engage an area defining a groove formed on an exterior surface of the first ring member;

a locking lining member, wherein the locking lining member is selectively operable to engage a surface of the stop block member;

a third sleeve member, wherein the third sleeve member is selectively operable to engage an area defining a groove formed on an exterior surface of the locking lining member and is selectively operable to engage the second sleeve member; and a screw member;

wherein the first ring member includes an area defining a groove formed on exterior surface thereof and a tapered surface formed on an inner surface thereof;

wherein the locking lining member includes a tapered surface formed on an exterior surface thereof that is selectively operable to engage the tapered surface of the first ring member by rotation of the second sleeve member that moves the third sleeve member and locking lining member in an axial direction; and wherein the screw member is selectively operable to interconnect the first ring member, second sleeve member, and second ring member together.

2. The rapid locking hand knob construct according to claim 1, wherein the tapered surface of the first ring member includes an area defining a groove formed thereon and the tapered surface of the locking lining member includes a rib member formed thereon, such that the groove on the tapered surface of the first ring member is selectively operable to engage the rib member of the tapered surface of the locking lining member so as to interconnect the first ring member and the locking lining member.

3. The rapid locking hand knob construct according to claim 1, wherein the screw member is selectively operable to engage an area defining an aperture formed on the second sleeve member and an area defining an aperture formed on the second ring member.

4. The rapid locking hand knob construct according to claim 1, wherein each end portion of the locking lining member is provided with an area defining an open-ended slot formed therein so as to impart flexibility to the locking lining member.

5. The rapid locking hand knob construct according to claim 1, wherein a rib member is formed on an interior surface of the first tube member that is selectively operable to engage an exterior surface of the second tube member.

* * * * *